United States Patent
Irie et al.

[15] 3,695,122
[45] Oct. 3, 1972

[54] CONTROL SYSTEM FOR AN AUTOMOTIVE AUTOMATIC POWER TRANSMISSION

[72] Inventors: Namio Irie, Yokohama; Ichimura Hirohisa, Yokohama, both of Japan

[73] Assignee: Nissan Motor Company, Limited, Yokohama, Japan

[22] Filed: Oct. 13, 1970

[21] Appl. No.: 80,310

[30] Foreign Application Priority Data
Oct. 13, 1969    Japan ................. 44/81384

[52] U.S. Cl. .................................................. 74/864
[51] Int. Cl. ............................................ B60k 21/00
[58] Field of Search ................ 74/863, 864, 866–869

[56] References Cited
UNITED STATES PATENTS

| | | | |
|---|---|---|---|
| 3,505,909 | 4/1970 | Maurice | 74/864 |
| 3,572,168 | 3/1971 | Shirai et al. | 74/866 |

*Primary Examiner*—C. J. Husar
*Attorney*—McCarthy, Depaoli, O'Brien and Price

[57] ABSTRACT

A control system for controlling the line pressure in a hydraulic control system of an automotive automatic power transmission, in which a line pressure regulator valve is controlled by a variable back pressure produced by a fluid jet nozzle which is electrically controlled in response to a variation in the vehicle speed, whereby a cutback is rapidly effected in the line pressure to effect a smooth shifting between the gear ratios.

6 Claims, 6 Drawing Figures

CONTROL SYSTEM FOR AN AUTOMOTIVE AUTOMATIC POWER TRANSMISSION

This invention relates to an automotive power transmission, and more particularly to a control system for the automotive automatic power transmission.

An automatic power transmission used in a motor vehicle commonly includes a hydraulic control system for controlling the friction elements, such as friction clutches and brakes, to selectively provide a plurality of gear ratios. To effect smooth shifting between the gear ratios, it is desirable to change a torque capacity of the friction elements in accordance with the variations in engine load and vehicle speed. The required torque capacity increases as the engine load increases so that it must be relatively great at starting or during low speed driving and relatively small during high speed.

If the torque capacity of such friction element is too small as compared to the required torque capacity at a given time, the slippage between the members to be coupled to each other will be too high, resulting in an inaccurate operation or runaway of the engine will take place. If, in contrast, the torque capacity of the friction element is too large, the clutch or brake will engage instaneously and thus an objectionable shock will take place. Since the torque capacity of the friction element depends on the level of a line pressure used in the hydraulic control system, smooth engagement of the friction elements can be accomplished by controlling the line pressure so as to minimize the difference between the torque capacity of the friction element and the required torque to be transmitted.

In the conventional hydraulic control system, the cutback of the line pressure is effected by hydraulically producing a cutback signal by the use of a certain suitable means, such as hydraulic shift valves. These shift valves, however, are not fully acceptable because of their limited responsiveness and inability of effecting a smooth shifting between the gear ratios particularly where the power transmission is controlled electronically.

It is, therefore, an object of the invention to provide an improved control system for rapidly effecting a cutback of a line pressure to minimize the shock or jerk of friction elements to be engaged, whereby the shifting between the gear ratios is effected smoothly.

It is another object of the invention to provide a control system adapted to electronically produce a cutback of the line pressure whereby the shifting of the gear ratios is effected quickly and precisely.

Figure 1:
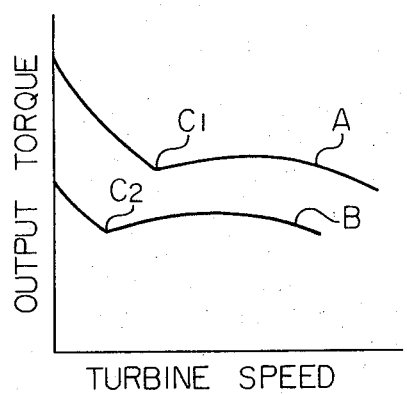
FIG. 1 is a graphical representation showing the variation of the output torque against the turbine speed of a torque converter used in a common automatic power transmission.

As illustrated in FIG. 1, the output torque of the torque converter varies in accordance with the turbine speed thereof. The curve A indicates the output torque of the torque converter at higher engine torque and the curve B the output torque of the torque converter at lower engine torque, wherein $C_1$ and $C_2$ indicate the respective coupling points of the torque converter. In order to achieve smooth engagement of the friction elements, it is preferable to control the line pressure substantially in proportion to the output torque of the torque converter. In accordance with the invention, a cutback signal is electronically produced in response to a variation in the turbine speed or in the vehicle speed. The cutback signal is then applied to the regulator valve of the hydraulic control system for effecting a cutback in the line pressure thereby to achieve smooth shifting between the gear ratios.

Figure 2:
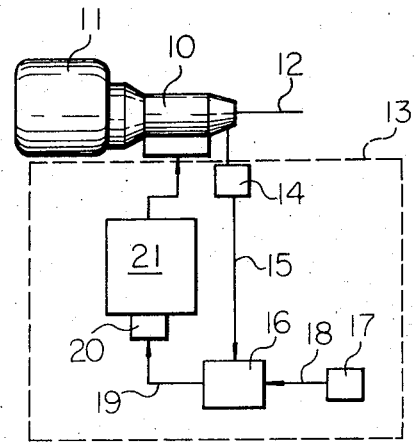
FIG. 2 is a schematic view of a control system embodying the invention.

A control system embodying the invention is schematically illustrated in FIG. 2, the system being shown as incorporated in a common automatic power transmission which is generally represented by reference numeral 10. The power transmission 10 has, as is customary, a drive shaft (not shown) which is connected to and driven by a suitable prime mover such as an internal combustion engine 11, and a driven shaft 12 which is connected by suitable means to driving wheels (not shown) of the motor vehicle.

A control system generally indicated by reference numeral 13 includes a vehicle speed sensor 14 for electronically detecting the vehicle speed or the revolution of the driven shaft 12 to generate a voltage signal corresponding thereto. The vehicle speed sensor 14 may be of any suitable electronic type having a negative voltage output which increases as the vehicle speed decreases. The voltage signal generated by the vehicle speed sensor 14 is applied through a line 15 to an electronic control circuit 16 where it is utilized for electronically producing a cutback signal. Connected to the electronic control circuit 16 is an engine torque sensor 17 which detects an output torque of the engine 11 for generating a voltage signal corresponding thereto. The engine torque sensor 17 may be of any suitable electronic type having a negative voltage output which increases as the engine torque increases. The engine torque may be determined by detecting an intake manifold vacuum or an accelerator pedal position. The voltage signal produced by the engine torque sensor 17 is also fed to the electronic control circuit 16 through a line 18. The electronic control circuit 16 is responsive to both the vehicle speed signal and engine torque signal and generates a cutback signal which is applied through a line 19 to an electronic actuator 20. In response to the cutback signal the electronic actuator 20 effects a cutback of a line pressure of the hydraulic control circuit 20. Thus, the hydraulic control circuit 20 controls the automatic power transmission 10 so as to achieve smooth engagement between the gear ratios.

Figure 3:
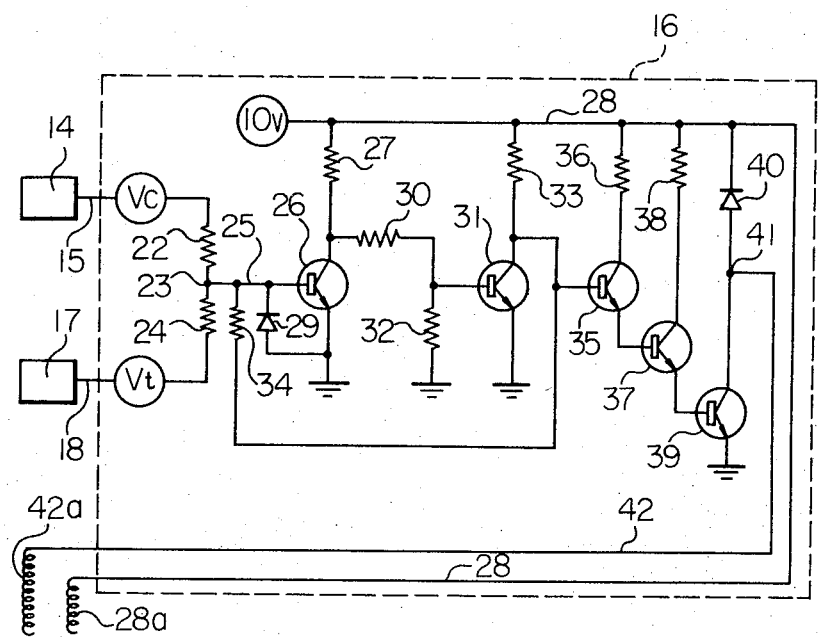
FIG. 3 is a diagram illustrating an example of the electric control circuit used in the control system of FIG. 2.

FIG. 3 shows an example of the electronic control circuit 16 which comprises a Schmidt trigger circuit. As shown, a voltage signal $V_c$ delivered from the vehicle speed sensor 14 through the line 15 is applied through a resistor 22 to a junction 23 while voltage signal $V_t$ transmitted from the engine torque sensor 17 through the line 18 is also applied to the junction 23 through a resistor 24. The voltage signal $V_c$ increases as the vehicle speed decreases while the voltage signal $V_t$ increases as the engine torque increases. The junction 23 is connected through a line 25 to the base of a transistor 26. The collector of the transistor 26 is connected through a resistor 27 to a power supply line 28 supplying a constant voltage of, for instance, 10 volts. The emitter of the transistor 26 is grounded. A diode 29 is connected between the emitter and the base of the transistor 26 to prevent a flow of an excessive voltage across the transistor. The collector of the transistor 26 is also connected through a resistor 30 to the base of a transistor 31. The base of the transistor 31 is grounded through a resistor 32. The collector of the transistor 31 is connected to the line 28 through a resistor 33 and the emitter thereof is grounded. The collector of the transistor 31 is connected through a resistor 34 to the line 25 and also to the base of a transistor 35. The transistor 35 has its collector connected to the line 28 through a resistor 36 and its emitter connected to a transistor 37. The collector of the transistor 37 is connected through a resistor 38 to the line 28, and the emitter thereof is connected to the base of a transistor 39. The collector of the transistor 39 is connected to the line 28 through a diode 40 which prevents a flow of an excessive voltage across the transistor 39. A junction 41 intervening between the diode 40 and the collector of the transistor 39 is connected to a line 42. The lines 28 and 42 are connected to lines 28a and 42a leading to a coil (not shown) of the electronic actuator 20.

When the voltage applied to the junction 23 exceeds a predetermined value, the transistor 26 becomes conductive, whereby the transistors 31, 35, 37 and 39 are also made conductive. Thus, the current passes from the electric power source to the lines 28a and 42a, leading to the coil of the electronic actuator 20, thereby operating the electronic actuator 20. When, on the other hand, the voltage applied to the junction 23 falls below a predetermined value, the transistor 26 and accordingly the transistors 31, 35, 37 and 39 are made nonconductive, causing the electronic actuator 20 to become inoperative. It will be noted that the voltage appearing at the junction 23 increases as the turbine speed decreases or as the engine torque increases.

Figure 4:
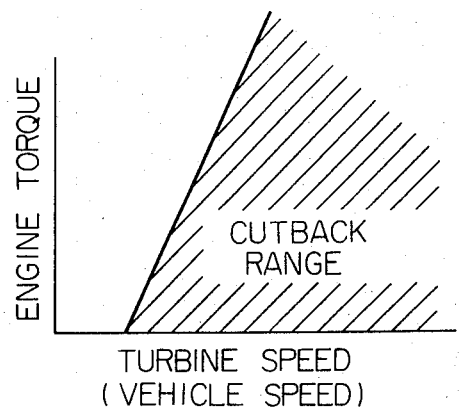
FIG. 4 is a graphical representation of a cutback range which is achieved where the control system of FIGS. 2 and 3 is used.

FIG. 4 illustrates an example of the range in which the electronic actuator 20 is held at rest. This range is referred to as the cutback range hereinafter.

Figure 5:
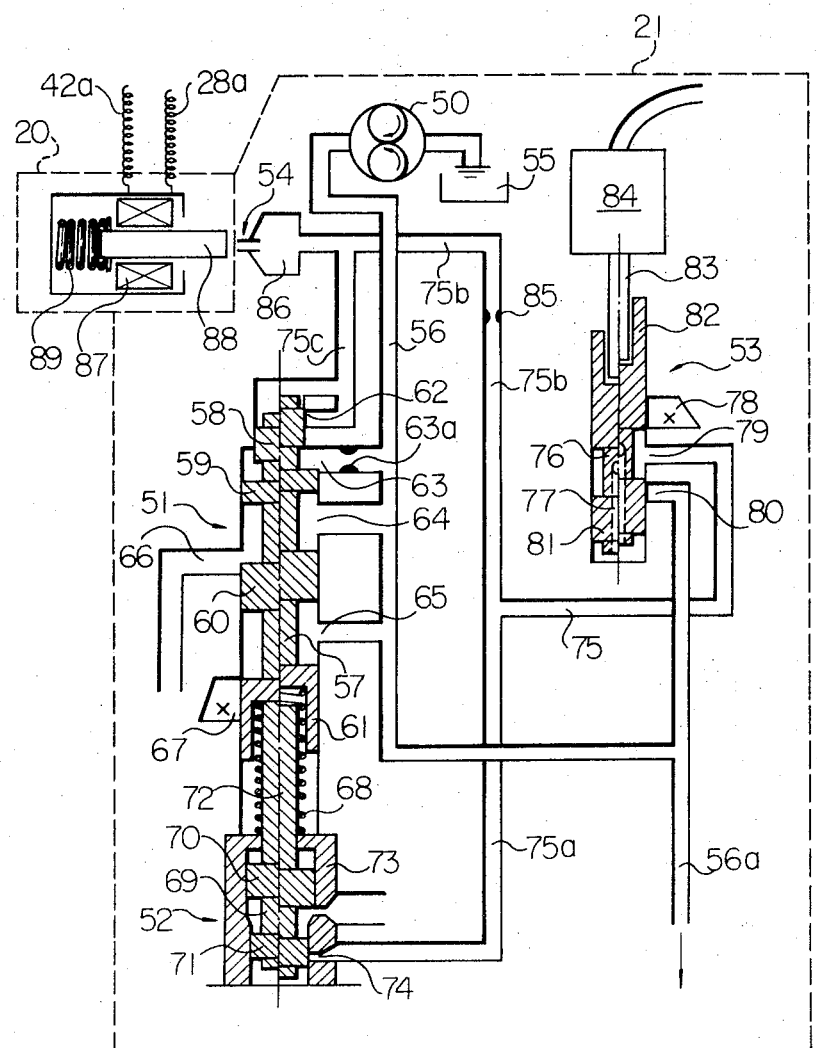
FIG. 5 is a schematic view illustrating an example of a hydraulic control circuit forming part of the control system of FIG. 2.

Referring next to FIG. 5, there is is shown the hydraulic control circuit 20 in detail which is controlled by the electronic control circuit 16 so as to effect the cutback of the line pressure. As shown, the hydraulic control circuit 21 includes an oil pump 50, a line pressure regulator valve 51, an amplifier valve 52, a throttle valve 53, and fluid jet nozzle 54 which is adapted to be controlled by the electronic actuator 20.

The oil pump 50, which may be of any suitable construction, supplied a pressurized fluid through a sump 55, which pressurized fluid is passed to a line pressure conduit 56. The line pressure 56 is connected to the line pressure regulator valve 51 which in turn is connected through a branch conduit 56a to control or servo devices, not shown, for actuating the friction clutches and brakes to effect shifting between the gear ratios in the power transmission.

The line pressure regulator valve 51 regulates the pressure in the line pressure conduit 56 and includes a slidable valve spool 57 having a plurality of spaced lands 58, 59, 60 and 61. The regulator valve 51 has ports 62, 63, 64, 65, 66 and 67. The port 62 communicates with the fluid jet nozzle 54. The port 63, which has an orifice 63a therein, communicates with the line pressure conduit 56, with which the ports 64 and 65 also communicate. The port 67 is a drain port through which the excess fluid in the line pressure conduit 56 is drained off to reduce the line pressure. A spring 68 is provided for moving the valve spool 57 upwardly of the drawing. As shown, the regulator valve 51 is operatively connected to the amplifier valve 52.

The amplifier valve 52 includes a slidable valve spool 69 having spaced lands 70 and 71. On the valve spool 69 is mounted a push rod 72 which cooperates with the land 61 of the regulator valve 51 to increase the line pressure in the line pressure conduit 56. The valve spool 69 is slidably disposed in a sleeve 73 which has a port 74 communicating with a branch conduit 75a of a conduit 75 which in turn communicates with the throttle valve 53.

The throttle valve 53 includes a slidable valve spool 76 having a bore 77 therein. The throttle valve 53 has a plurality of ports 78, 79 and 80. The port 78 is a drain port. The port 79 communicates with the conduit 75 while the port 80 communicates with a branch conduit 56b communicating with the branch conduit 56a. The valve spool 76 has spaced lands 81 and 82. On the land 82 is mounted a push rod 83 of a throttle modulator valve 84 which communicates with the intake manifold (not shown) of the engine. The throttle modulator valve 84 operates in accordance with the variation in the intake manifold vacuum of the engine so that the push rod 83 moves toward the valve land 82. Thus, the push rod 83 biases the valve spool 76 downwardly of the drawing.

On the other hand, the fluid pressure in the port 79 is drawn into the fluid chamber (not numbered) of the throttle valve 53 and thus acts on the lower end of the valve land 81. By this action, the fluid pressure is modulated to a value that is determined by the force acting on the valve land 82. Consequently, the fluid pressure in the conduit 75 rises when the throttle valve is fully opened and falls when the throttle valve is slightly opened, that is, when the intake manifold vacuum is relatively high. Thus, the fluid pressure in the port 79 responds to the intake manifold vacuum of the engine, and is utilized for varying the line pressure. This fluid pressure is referred to as a throttle pressure hereinafter.

The throttle pressure in the conduit 75 is distributed to the port 74 of the amplifier valve 52 and acts on the land 71 to move the valve spool 69 upwardly of the drawing. This causes the valve spool 57 of the regulator valve 51 to move upwardly, thereby blocking the communication between the ports 64 and 66 and the communication between the ports 65 and 67. Thus, the line pressure is increased in the line pressure conduit 56. As the intake manifold vacuum increases, the line pressure in the regulator valve 51 is increased accordingly. The torque capacity required of the friction elements is established. It will thus be understood that, as the throttle pressure decreases, the line pressure decreases.

In order to change the torque capacity of the friction elements, it is necessary to effect a cutback of the line pressure as the vehicle speed increases, as previously discussed above. This is because of the fact that the torque converter operates at a reduced torque ratio as the vehicle speed increases. When the vehicle speed is increased, it is desired that the torque delivered from the torque converter be reduced since the torque ratio itself is decreased then. A desired cutback of the line pressure is effected through operation of the fluid jet nozzle 54.

The fluid jet nozzle 54 communicates with a fluid chamber 86 to which the throttle pressure is distributed through an orifice 85 provided in the branch conduit 75b. The sectional area of the nozzle 54 is greater than that of the orifice 85, so that the fluid pressure in the fluid chamber 86 is higher than the throttle pressure in the conduit 75. The fluid jet nozzle 54 cooperates with the electronic actuator 20.

The electronic actuator 20 is herein shown to be constructed as a solenoid device comprising a solenoid coil 87, a combination armature and plunger 88 and a spring 89 for biasing the plunger 88 to protrude. The electronic actuator 20 is so arranged that the plunger 88 protrudes to close the fluid jet nozzle 54 when the vehicle is driven at a moderate speed. At this instant, the electronic actuator 20 is held inoperative, so that the power loss is saved considerably.

When, in operation, the electronic actuator 20 is energized, then the plunger 88 is retracted so that the nozzle 54 is opened. The fluid obtaining in the fluid chamber 86 is then discharged through the nozzle 54. Consequently, the fluid pressure in the branch conduit 75c yields to the force of the spring 68 of the regulator valve 51. In this instance, the throttle pressure is passed to the port 74 of the amplifier valve 52. The throttle pressure then acts on the land 71 to move the push rod 72 upwardly. This causes the valve spool 57 to move upwardly, thereby interrupting the communications between the ports 64 and 66 and between the ports 65 and 67. Thus, the line pressure rises in the line pressure conduit 56 when the vehicle is driven at a relatively low speed.

When, now, the electronic actuator 20 is de-energized, then the plunger 88 protrudes into closing contact with the nozzle 54. The nozzle 54 being closed, a back pressure is built up in the fluid chamber 86. The back pressure is passed through the branch conduit 75c to the port 62 and thus acts on the land 58 of the regulator valve 51. This causes the valve spool 57 to move downwardly against the force of the spring 68, with the result that the communications between the ports 64 and 66 and between the ports 65 and 67 are established. The fluids in the line pressure conduit 56 are now drained off from the drain ports 66 and 67. The cutback is thus effected in the line pressure and hence the line pressure applied to the friction elements is decreased. The friction elements are then actuated softly at higher vehicle speeds and an undesirable shock is prevented.

Figure 6:
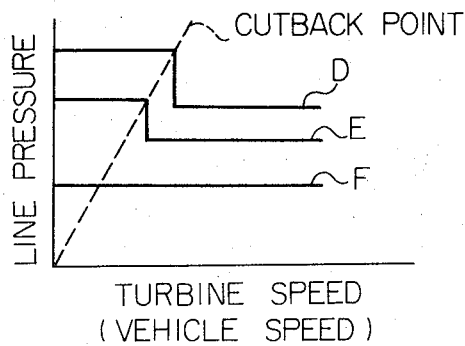
FIG. 6 is a graphical representation of the line pressures which are obtainable in accordance with the invention.

In FIG. 6 there is illustrated the variation in the line pressure which is obtained as a result of the action of the electronic actuator and the fluid jet nozzle. In FIG. 6, curves D, E and F indicate the line pressure at high, intermediate and low engine torque, respectively. As shown, the larger than engine torque, the greater is the movement of the cutback point toward the higher turbine speed, whereby a desired cutback is effected in the line pressure. When the engine torque is at minimum, the throttle pressure is close to zero, so that there is established no cutback. For this reason the variation in the line pressure is represented by a straight line.

It will be apparent from the foregoing that, in accordance with the invention, a cutback signal is produced electronically so that a satisfactory responsiveness is obtained.

Since, moreover, the electronic actuator is of the type that the plunger 88 is retracted when energized, there is no need to supply an electric current to the actuator in the cutback range shown in FIG. 4, so that the power loss is minimized under normal driving conditions of the vehicle.

It should also be understood that the same results can be obtained by utilizing a voltage signal developed in accordance with the vehicle speed instead of turbine speed of the torque converter.

What is claimed is:

1. A control system for controlling a line pressure in a hydraulic control system for an automatic power transmission of a motor vehicle driven by an internal combustion engine, comprising, in combination, a line pressure regulator valve provided in said hydraulic control system for regulating the line pressure therein, a fluid jet nozzle connected to said regulator valve, a first sensing means operatively connected to the driven shaft of said transmission to sense vehicle speed for generating a first voltage signal corresponding thereto, a second sensing means operatively connected to the intake manifold of the engine to sense an output torque of the engine for generating a second voltage signal corresponding thereto, an electronic control circuit electrically connected to said first and second sensing means for producing a cutback signal in response to said first and second voltage signals, and an electronic actuating means electrically connected to said electronic control circuit and having a movable member movable toward and away from said fluid jet nozzle, said electronic actuating means being responsive to said cutback signal to cause said movable member to close said fluid jet nozzle for thereby producing a back pressure to effect a cutback in said line pressure through said regulator valve.

2. A control system according to claim 1, wherein said first voltage signal increases as the vehicle speed decreases and wherein said second signal increases as the engine torque decreases.

3. A control system according to claim 2, wherein said cutback signal is produced when said first and second voltage signals become lower than a predetermined value.

4. A control system according to claim 1, wherein said line pressure regulator valve is connected to a throttle valve producing a throttle pressure in relation to the output torque of the engine, said throttle pressure being applied to said line pressure regulator valve to effect a cutback in line pressure.

5. A control system according to claim 1, wherein said electronic actuating means is controlled in response to the vehicle speed and engine torque to raise a cutback point to a higher level as the engine torque increases.

6. A control system according to claim 1, wherein said electronic control circuit comprises a Schmidt trigger circuit including a plurality of transistors, resistors and diodes adapted to effect "ON" and "OFF" operations for generating a cutback signal.

* * * * *